United States Patent
Starr

[15] 3,693,840
[45] Sept. 26, 1972

[54] DISPENSING DEVICE FOR SALT AND THE LIKE

[72] Inventor: George N. Starr, 1034 Craigwood Drive, Memphis, Tenn. 83116

[22] Filed: Dec. 18, 1970

[21] Appl. No.: 99,531

Related U.S. Application Data

[63] Continuation-in-part of Ser. No. 15,463, March 2, 1970, abandoned.

[52] U.S. Cl. ............................................. 222/193
[51] Int. Cl. ............................................. A47f 1/03
[58] Field of Search ........................... 222/193, 195

[56] References Cited

UNITED STATES PATENTS

| | | |
|---|---|---|
| 2,668,388 | 2/1954 | Thompson ................. 222/193 |
| 1,669,084 | 5/1928 | Grindle ..................... 222/193 |

*Primary Examiner*—Stanley H. Tollberg
*Attorney*—John R. Walker, III

[57] ABSTRACT

A machine used to automatically dispense a regulated quantity of hygroscopic granular substances as salt or the like onto a continuously moving processed food product, e.g., dough or cheese, while in a phase of preparation. The machine includes a prime mover which drives an air blower and an agitator, a pressurized hopper including a unique co-acting valve agitator assembly, a pneumatic conveyor and a cyclonic separator.

An alternate embodiment is also included which comprises substituting one type restrictor orifice fitting with a second type. Each of the two type restrictor fittings includes a variable restrictor orifice, i.e., the one for the principal embodiment is a globe valve while the alternate one is a sliding action piston or divider valve.

10 Claims, 8 Drawing Figures

FIG. 1

INVENTOR.
GEORGE N. STARR

INVENTOR.
GEORGE N. STARR

BY John R. Walker III
Attorney

DISPENSING DEVICE FOR SALT AND THE LIKE

CROSS-REFERENCE TO RELATED APPLICATION

This is a continuation-in-part of my co-pending application, Ser. No. 15,463, filed Mar. 2, 1970, entitled "Dispensing Device for Salt and the Like", now abandoned.

BACKGROUND OF THE INVENTION

1. Field of the Invention

This invention relates to pneumatic dispensing devices for hygroscopic granular substances, as salt or the like.

2. Description of the Prior Art

In food processing plants, it is quite often necessary to apply salt, or other hygroscopic granular substances, at a controlled rate to the product which is being processed. This is often accomplished by a salt dispenser suspended over a conveyor carrying the product. Salt is applied to the product as it moves under the salt dispenser. Heretofore, the typical salt dispenser comprises a supply hopper, a mechanical agitator positioned adjacent the bottom portion of the hopper and a metering wheel which somewhat resembled a waterwheel and carried granules of salt from he dispensing opening of the hopper directly onto the product as it moved along. The rate of flow of the salt was controlled by the speed of the metering wheel and when properly coordinated with product flow rate, this apparatus would produce the desired salt to product ratio.

This type of device had, however, the following disadvantage: If the nature of the product was such that steam or water vapor rose from it and/or if high humidity conditions were present, the possibility of condensation of water on the metering wheel existed, particularly, in view of the hygroscopic characteristics of salt. This would cause the salt to stick and cake up in the grooves of the metering wheel and result in, if not a complete stoppage, at least inaccurate metering.

Patents which the applicant has knowledge of are:

a. The Hopper U. S. Pat. No. 637,118 which pertains to an insect powder duster comprising a hopper with an agitator and triangular plate valves that control the rate of discharge and a bellows which operates the agitator and draws powder by suction through the hopper into the powder chamber and forces the powder through the chamber and connecting tubes to the discharge nozzles.

b. The Babcock et al. U. S. Pat. No. 1,107,015 which pertains to a dust spraying machine comprising a hopper having an agitator adjacent its outlet that is positioned directly over an air pipe through which is forced a strong current of air. Interposed between the outlet of the hopper and the opening into the air pipe is a sliding gate which may be moved so as to partly or entirely close the outlet from the powder receptacle.

c. The Higgins U. S. Pat. No. 2,414,150 which pertains to a pneumatic conveyor for moving ashes from ashpits located under boilers and is discharged in a conventional cyclone separator at a remote receiving dumpcar or the like. This patent teaches the use of a venturi to create a suction in the lines beneath the ashpits to readily admit ashes into the pipeline.

d. The O'Neal U. S. Pat. No. 3,186,770, which relates to a condition responsive control method and more particularly to continuously automatic control of a vibrator feed device for introducing material into a pneumatic conveyor system. This patent incorporates an electronic responsive control for maintaining a constant flow of material through the pneumatic system. This patent incorporates an electronic responsive control for maintaining a constant flow of material through the pneumatic system. This invention is particularly directed towards moving great quantities of material, i. e., 200 lbs. per minute and operates on the principle of changing air pressures when the pneumatic conveyor becomes overloaded or underloaded, thereby effecting certain actions which adjust the flow of material accordingly. A significant feature of the O'Neal device is that it is designed so as to effectively operate at or near an optimum capacity without choking, with the intention being to move the greatest quantity of salt per minute rather than controlling smaller quantities, i.e., within tolerances acceptable for processing food.

SUMMARY OF THE INVENTION

The present invention is directed towards overcoming the heretofore-mentioned and other disadvantages associated with dispensing salt or other hygroscopic granular substances at a controlled rate to food or other products which are being processed. In the development of the present invention, my first dispenser was designed to obviate the moisture problem that develops from steam or water vapor rising from he product. This device was based on well known principles of pneumatic conveying and included a pressurized funnel-like hopper having a butterfly valve in the tube portion. The lower end of the tube terminated at a junction with an air duct. This device operated as follows: a static pressure was built up in the hopper such that when the butterfly was opened, the air pressure in the hopper being slightly greater than that in the air duct allowed material in the hopper to fall downward around the butterfly valve where it became entrained in the air stream and thereby conveyed through a suitable conduit to the desired location. The conveyed material was discharged directly onto the product and the quantity was controlled by the degree of opening of the butterfly valve. The problem associated with steam or vapor rising directly from the product was solved since he hopper was located remote from the product. However, the hygroscopic characteristics of the sodium chloride still presented a problem, e. g., the moisture contained in the air supply would cause the salt to stick to the butterfly valve and/or form cakes which would not fall through the restricted opening. The obvious solution to this problem seemed to incorporate an agitator to break up any lumps before they reach the butterfly valve. At the onset, the solution to the problem might seem quite simple, i. e., design the agitator such that it will pass only a certain size or smaller particle and the butterfly valve will function in a usable range for the desired purpose. However, the foregoing is effective only as long as the salt is being flowed. Closing the butterfly valve, even though the agitator is still turning, causes salt to cake up in the spaces between the agitator and butterfly valve. When this occurs, the valve cannot function properly even if forced open. Also, there will always exist a certain volume in which no agitation will occur and lumps therein will not be broken up which will clog the valve.

In obviating this problem I arrived at the following conclusion: The valve/agitator device must be constructed such that a minimum of space exists between the two components. The device of the present invention includes a valve which lends itself to this discovery. The valve comprises a sleeve-like inner tubular member and an outer tubular member each having an opening in the walls thereof and arranged to slide or rotate one relative to the other. The size of the opening can be varied by rotating or sliding one tube with respect to the other so as to meter over a predetermined range the flow of the salt. Accordingly, opening and closing of the valve so as to control the flow of salt does not cause caking or the like which would result in inaccurate metering. In other words, when it is desired to terminate the dispensing of salt, the valve is completely closed and the rotating blades of the agitator are constantly sweeping the opening so that when the valve is again opened, a reliable quantity of salt is dispensed.

The salt dispensing device of the present invention includes a prime mover which drives a filtered air blower in addition to the above-mentioned agitator, a pressurized funnel-like hopper having the above-mentioned valve/agitator assembly positioned adjacent the lowermost portion thereof, a pneumatic conduit and a typical cyclonic separator.

The air blower forces a current of air through the tubular aforementioned valve which is in communication with the cyclonic separator. A restricting orifice interposed between the blower and valve causes a static pressure to build up in a chamber just ahead of the orifice. This static pressure is directed through a suitable conduit to the uppermost portion of the hopper, thereby pressurizing the hopper. The static pressure in the hopper is such that when the valve is opened, the pressure tends to equalize; accordingly, material in the hopper will gravitate downward passing the rotating agitator and flow through the valve where it will become entrained in the airstream and thereby moved by the pneumatic conveyor to the product or any desired location. The orifice is preferably a variable one, easily accomplished by a globe or needle valve, so that the amount of salt can be varied.

The pneumatic conveyor could simply terminate at a nozzle for discharging the salt laden air directly onto the product; however, this also has certain disadvantages: (a) The air/salt mixture would be striking the product at a fairly high velocity and could result in an uncontrolled deposit pattern; (b) the blast of air would tend to cool and dry the product both of which tend to alter its characteristics undesirably. Therefore, I prefer to apply the salt to the product by utilizing a cyclonic separator. The salt laden air enters the cyclonic separator tangentially and its velocity is slowed to the point where the air will no longer suspend the salt which gravitates down while the air is vented out through the top of the separator, thus obviating the above-mentioned disadvantages.

The earlier mentioned problem, i. e., water vapor rising from the product and being absorbed by the salt, is obviated by a sustained flow of air through the cyclone separator, with or without entrained salt. This cyclone separator is designed so as to exhaust most of the air out the top; however, a slight air current flows downwardly which prevents the humid vapors from rising within it. Accordingly, in normal operation the device of the present invention would have air flowing through the separator continuously when processing food and the salt would be dispensed, when desired, by opening and closing the valve to a predetermined setting.

An alternate embodiment is also included which comprises substituting one type restrictor orifice fitting with a second type. Each of the two type restrictor orifice fittings includes structure for varying the size of the orifice so that the amount of salt being dispensed can be varied. Also, each of the two type fittings includes structure for controllably passing air from the blower to the uppermost portion of the hopper or for discontinuing or blocking air passage from the blower to the uppermost portion of the hopper. However, it is necessary to disrupt the calibrated setting of the fitting of he principal embodiment, i. e., a globe or needle valve, in order to discontinue passage of air from the blower to the uppermost portion of the hopper.

In other words, an optimum setting of the adjustable structure of the globe or needle valve, for a particular product being processed, probably results to a certain degree from a trial and error adjustment thereof. Accordingly, opening the globe or needle valve accomplishes the desired end result, i. e., the hopper is no longer pressurized. However, in so doing, the optimum setting for the globe or needle valve has been destroyed. Thus, when it is desired to again start dispensing salt, the optimum setting for the globe or needle valve is not immediately achieved. On the other hand, if the processing situation is continuous, this problem is non-existent since the dispensing of salt preferably never ceases. In this situation, the entire dispensing device is simply shut down at the end of the day, etc.

The alternate embodiment replaces the globe or needle valve with a sliding action piston or divider valve. This divider valve includes adjustable structure for varying the amount of salt being dispensed and for selectively discontinuing pressurization of the hopper. However, the adjustment of he divider valve is not disturbed when dispensing of salt is sporadically halted which preferably includes depressurization of he hopper. This is attributable to the implementation of an adjustable stop apparatus which limits the travel of the sliding piston when the hopper is pressurized and which is not affected by the movement of the piston as it travels to a position which blocks passage of air from the blower to the uppermost portion of the hopper.

DESCRIPTION OF THE PREFERRED EMBODIMENT

The device 11 of the present invention comprises a motor or prime mover 13 driving an air blower 15 having an intake filter 17, a pressurized hopper 19 having a valve 21 and a co-acting agitator 23 positioned in the bottom portion thereof, a pneumatic conduit 25 communicating the hopper 19 with a cyclonic separator 27.

The blower 15 pulls environmental air through a conduit 29 which is in communication with the filter 17. The filtered air is forced by the blower 15 through a conduit 31 to a restrictor fitting 33. The restrictor fitting 33 includes an upstream air chamber 35, a downstream air chamber 36, and a variable restriction orifice, such as a needle valve or a globe valve 37 controlled by turning knob 38. The air chamber 35 is in communication with the interior of the sealed cover 39 of the hopper 19 by a suitable conduit 41, and the downstream air chamber 36 is in communication with the valve 21. It should be understood that the restrictor fitting 33 causes the air pressure in the conduit 41 to be slightly greater than the air pressure in the chamber 36, thus developing a slightly elevated air pressure within the cavity 45 of the hopper 19 as compared to the air pressure within the valve 21.

The prime mover 13, having a double V-drive pulley 47, drives an endless blower belt 49 and an endless belt 51 coupled to a pulley 53 of a speed reducer assembly 55. The speed reducer assembly 55 having an output drive pulley 57, drives an endless belt 59 that is coupled to a pulley 61 attached to a drive shaft 63 (FIG. 2) upon which agitator 23 is fixedly mounted and caused to rotate at a relatively low RPM.

Figure 1:
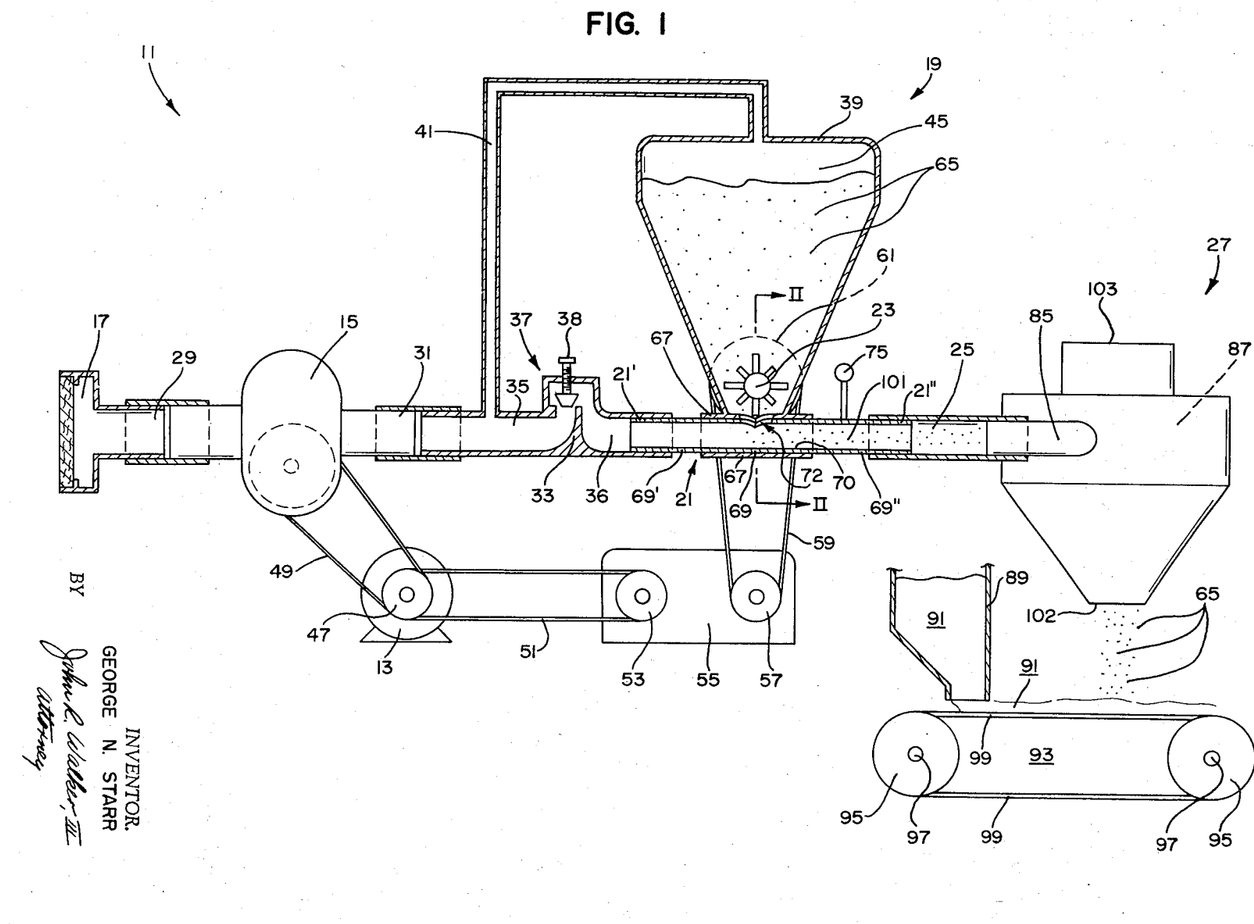
FIG. 1 schematically depicts the device of the present invention in its entirety and illustrates a preferred utilization whereby the device dispenses salt onto processed food moving along a conveyor belt.

The funnel-like cavity 45 of the hopper 19 is filled with salt granules 65 and the cover 39, having an airtight seal, is removably secured by a plurality of swingbolts and swingpins or the like (not shown). Situated adjacent the lowermost portion 19' (FIG. 2) within the cavity 45 of the hopper 19 is the unique agitator 23, best viewed in FIGS. 2 and 6. As can readily be viewed in FIG. 2, the lowermost portion of the hopper 19' terminates at an elongated tubular member 67 which constitutes the outer end stationary portion of the valve 21. A second elongated tubular member 69, having a length considerably greater than that of the member 67 and an outside diameter slightly less than the inside diameter of the member 67, is inserted through the member 67 so that two substantially equal portions 69', 69" (FIG. 1) extend outwardly from the opposite ends of member 67. It should be understood that the member 69 may be freely rotated within the member 67 and that suitable seals, i. e., O-rings or the like (not shown) preferably are incorporated between the relatively moving parts: 67, 69; 33, 69' and 25, 69" (FIG. 1). From the foregoing, it will be understood that valve 21 has an upstream end 21', a downstream end 21" and a continuous passage 70 between ends 21', 21".

A symmetrically centered aperture 71 which is preferably diamond-shaped is provided in the wall of the tubular member 67 and opens into the lowermost portion 19' of he hopper 19. The four sides of the aperture 71 preferably taper inwardly toward the center thereof, as best viewed in FIGS. 1 and 2. The member 69 has an aperture 73, preferably diamond-shaped, suitably aligned with the aperture 71, having four sides which taper inwardly toward the center thereof so that when the valve is fully opened (FIG. 5), the four sides of the aligned apertures 71, 73 are flush or form four continuous surfaces which constitute an opened dispensing metering orifice 72. In other words, the dimensions of the aperture 71 are slightly less on the inner wall of the member 67 than those on the outer wall of the member 67 and likewise for the aperture 73. However, the larger dimensions of the aperture 73 on the outer wall of the member 69 are substantially equal to the smaller dimensions of the aperture 71 on the inner wall of the member 67.

Figure 3:
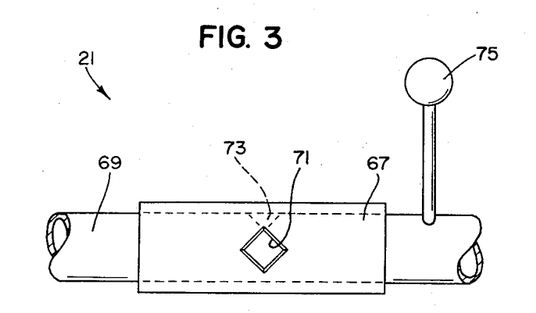
FIG. 3 is a plan view of he valve depicted as in a closed position, having conjunctive hopper portions removed for clarity.

The valve 21 comprising the two above-mentioned tubular members 67, 69 also includes an actuating handle 75. It can readily be seen in FIGS. 3, 4 and 5 that the handle 75, being secured to the member 69 as by welding or the like, may be swung in an arc in one direction or the other to cause the member 69 to rotate and vary the size of orifice 72 to open or close the valve 21.

Figure 2:
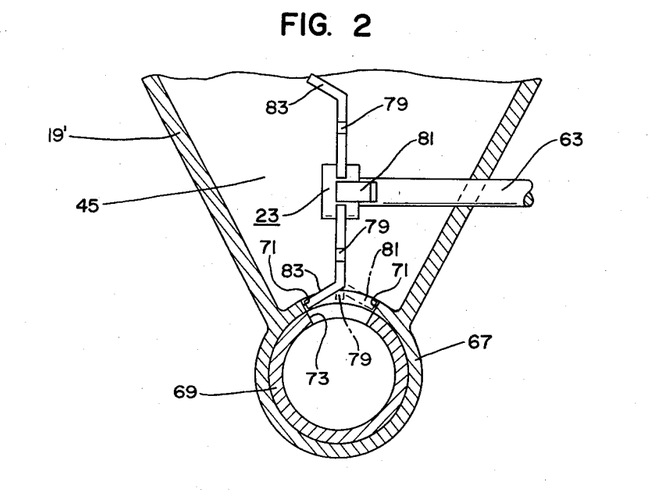
FIG. 2 is a sectional view taken as on the line II—II of FIG. 1 depicting the agitator and valve assembly and the interrelationship thereof.
Figure 6:
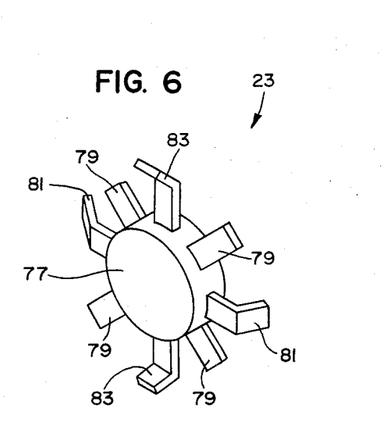
FIG. 6 is a perspective view of the agitator.

The agitator 23, being removably secured to the shaft 63 in a typical manner, i. e., a set screw (not shown) threaded through a suitably tapped hole (not shown) engaging a flattened end portion of the shaft 63, is positioned so that its generatrix is closely adjacent the inner tubular member 69. The agitator 23 comprises an annular hub portion 77 and a plurality of radially arranged blades having three distinct configurations: straight blade 79; blade 81 having the end portion bent inwardly (substantially as shown in FIGS. 2 and 6) toward the pulley 61 and blade 83 having the end portion bent outwardly (substantially as shown in FIGS. 2 and 6) away from the pulley 61. The agitator 23 has (a) four straight blades 79 symmetrically positioned about the annular hub 77 at a relative displacement of substantially 90°; (b) two opposing blades 81 each positioned intermediate two adjacent blades 79 so that the longitudinal center lines thereof are displaced substantially 45° from either longitudinal center line of the two adjacent blades 79; (c) two opposing blades 83, positioned intermediate two adjacent blades 79 so that the longitudinal center line of each is displaced approximately 90° from the longitudinal center line of either blade 81. FIG. 2 shows one blade 83 adjacent diamond-shaped aperture 71 in the member 67, thus sweeping the left side of the aperture 71, as shown in FIG. 2. The blade 79 is shown in FIG. 2 in broken lines as it sweeps the center of the aperture 71, and the blade 81 is shown in broken lines as it sweeps the right side of the aperture 71 of the member 67.

Conduit 25 extends from the inner member 69 of the valve 21 to an inlet tubular member 85 tangentially positioned with respect to the annular cavity 87 of the cyclonic separator 27. Since a cyclonic separator is a well known principle and the structure of the cyclonic separator 27 utilized in the present invention is typical, further details thereof are considered unnecessary and obvious to those skilled in the art.

The device 11 of the present invention is illustrated for use in conjunction with processing a food product, e. g., dough or cheese. A typical processing method comprises a mixing hopper 89 (FIG. 1), having a valve (not shown) or the like positioned in the bottom thereof, dispensing the food product as cheese 91 onto an elongated conveyor 93. The conveyor 93 comprises a pair of rollers 95 respectively rotatably attached to shafts 97 and driving an endless belt 99 which moves the food product 91 subjacent the cyclonic separator 27. The prime mover 13 is energized in a typical fashion, i. e., an electric switch (not shown), which causes the blower 15 to pull environmental air through the filter 17 and force the air through the conduit 31 to the restrictor fitting 33. The restrictor fitting 33 causes a static air pressure to develop in the chamber 35 which is in communication with the uppermost portion of the cavity 45 of the hopper 19. The valve 37 of the fitting 33 allows a passage of air into the valve 21.

The cavity 45 of the hopper 19 which is filled with salt granules 65 has a slightly greater air pressure than does the valve 21, as previously described. The prime mover 13 also drives the agitator 23, in a manner previously described, whereby the rotating blades 79, 81, 83 of the agitator 23 continually sweep the aperture 71 obviating caking or the like of the salt granules 65. Any lumps of salt when they are contacted by agitator 23 are either broken up or moved out of aperture 71 for subsequent breaking. Thus, it is assured that the apertures 71, 73 are not blocked by lumps or cakes of salt and that salt granules will flow freely through the apertures 71, 73 when the handle 75 is moved so as to open the metering orifice 72 of the valve 21, as best viewed in FIGS. 4 and 5.

Figure 4:
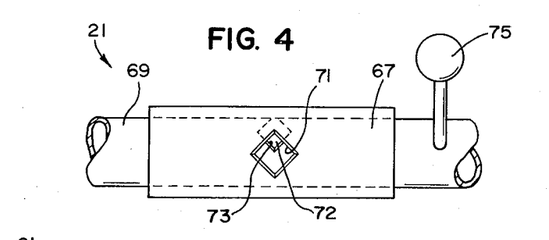
FIG. 4 is a plan view of same depicted as in a partially closed position.
Figure 5:
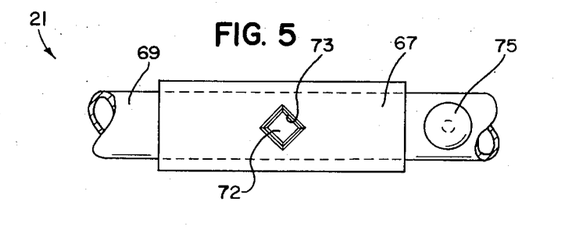
FIG. 5 is a plan view of same depicted in a fully open position.

With the handle 75 in a position such as shown in FIGS. 4 and 5, salt granules will be entrained into the air current passing through the valve 21. The conduit 25 communicates the salt laden air 101 to the cyclone separator 27, and the salt granules 65 gravitate out the truncated conical bottom opening 102 of the separator 27. The function of the cyclone separator 27 is such that a slight current of air flows out the bottom which prevents any steam or moisture vapors which may be rising from he food product 91 from going up into the cavity 87 of the separator 27. The remainder of the air from cyclone separator 27 flows out through the opening 103 in the top thereof.

During the entire phase of preparation of the food product 91, the prime mover 13 would be energized forcing air out the separator 27. Rather than de-energize the device 11 when it is desired to cease dispensing salt, the valve 21 is opened and closed to regulate and/or cut off a flow of salt granules 65. Also, the amount of salt may be regulated by changing the opening of valve 37. This continuous flow of air prevents moisture vapors, rising from the food product 91, from entering the cavity 87 of the separator 27. The device 11 of the present invention is capable of accurately dispensing any quantity of salt, as for example, within the limits of 1 to 5 pounds per minute. Thus, for example, a typical food product 91 requiring a 2 percent salt content would be processed at the rate of 100 pounds per minute and the device 11 would be set to dispense 2 pounds per minute, thus dispensing the required 2 percent content of salt granules 65.

DESCRIPTION OF AN ALTERNATE EMBODIMENT

Figure 7:
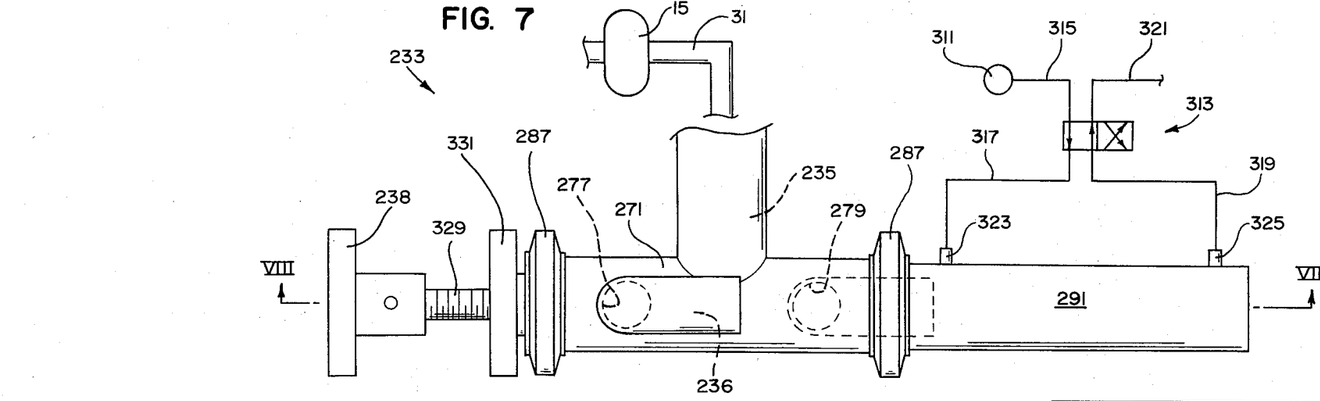
FIG. 7 is an enlarged side elevational view of a sliding action divider valve as used in an alternate embodiment, schematically showing a preferred system for actuating the valve.
Figure 8:
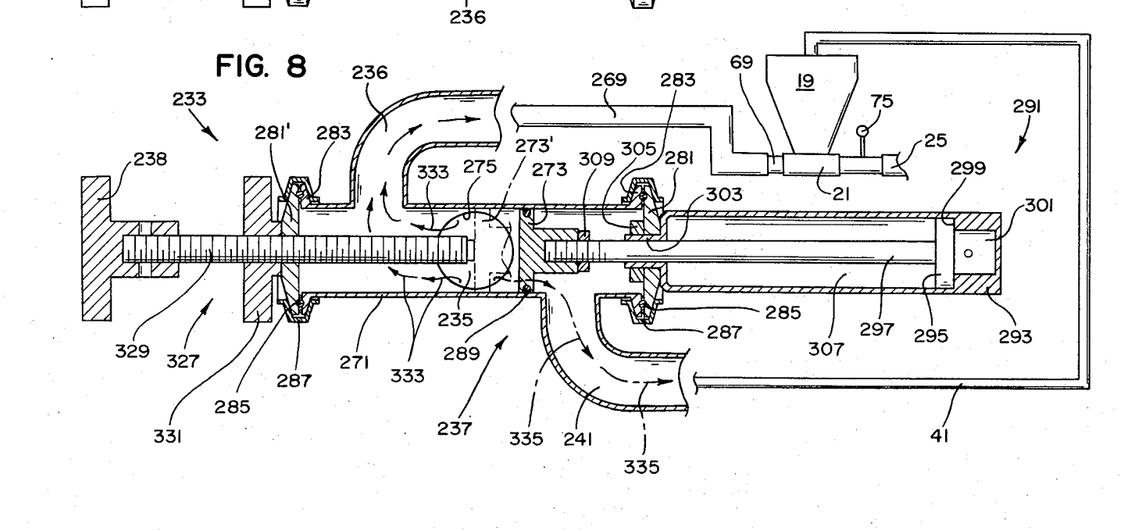
FIG. 8 is a sectional view taken as on the line VIII—VIII of FIG. 7, additionally showing sufficient structure as depicted in FIG. 1 to clearly orient the alternate valve with the remaining structure of the dispensing device.

The alternate embodiment of the invention is depicted in FIGS. 7 and 8 of the drawings and comprises a sliding action piston or divider valve 233. The concept of the alternate embodiment is to substitute the valve 233 for the restrictor fitting 33. It should be recalled that the restrictor fitting 33 included the upstream air chamber 35, the downstream air chamber 36, and the variable restriction orifice or globe valve 37. However, the divider valve 233 will herein be disclosed as including in general an upstream air chamber 235, a downstream air chamber 236, a hopper pressurization air chamber 241, and a variable restriction orifice assembly 237.

From FIG. 7 of the drawings, it may be seen that the upstream air chamber 235 is in communication with the air blower 15 through the heretofore-disclosed conduit 31. From FIG. 8 of the drawings, it may be seen that the downstream air chamber 236 is in communication with the tubular member 69 of the valve 21 through an additional conduit 269.

The variable restriction orifice assembly 237 includes a cylinder 271 which slidably receives a piston 273. The cylinder 271 is provided with an upstream port 275 which communicates the interior of the cylinder 271 with the upstream air chamber 235, a downstream port 277 which communicates the interior of the cylinder 271 with the downstream air chamber 236, and a hopper port 279 which communicates the interior of the cylinder 271 with the hopper pressurization air chamber 241.

The cylinder 271 includes a pair of end plates or cap members 281, 281' which are sealably attached to the cylinder 271 in any well known manner, e. g., the cylinder 271 terminates at the ends thereof with outwardly directed flange portions 283 defining faces for receiving annular gaskets 285 which contiguously engage the outer periphery of the cap members 281, 281' and the faces or flange portions 283. The end plates 281, 281' preferably are clampingly secured to the cylinder 271 by a pair of typical annular clamps 287, i.e., the clamps 287 having binding bolts (not shown) which, when tightened securely, urge the cap members 281, 281' inwardly so as to compress the gasket 285.

The piston 273, having an outside diameter slightly less than the inside diameter of the cylinder 271, optionally includes an O-ring 289 for engaging the interior wall of the cylinder 271 so as to more positively seal the front side of the piston 273 from the back side thereof. The piston 273 is slidably moved to and fro within the cylinder 271 in any well known manner, e. g., a pneumatic actuating cylinder 291 or the like.

The actuating cylinder 291 includes the usual cylinder body 293 and the usual piston 295 attached to the usual actuating rod 297. The wall of the cylinder body 293 preferably terminates at the distal end thereof inwardly with a reduced diameter or shoulder portion 299 forming a cavity 301. The proximal end of the cylinder body 293 includes a projecting sleeve portion 303 which slidably receives the actuating rod 297. The actuating rod 297 is free to slide to and fro within the sleeve portion 303. However, the sleeve portion 303 sealably engages the actuating rod 297 so as to preclude passage of air between the rod 297 and the sleeve 303. The cap member 281 is provided with a concentric aperture for threadedly receiving the sleeve portion 303. A jam nut 305 preferably engages the sleeve 303 and is tightened securely against the inner surface of the cap member 281. The interior wall of the cylinder body 293 forms a cavity 307 on the back side of the piston 295, i. e., the piston 295, having a diameter slightly less than the diameter of the cavity 307, is free to slide to and fro within the cavity 307.

The piston 295 and the actuating rod 297 may preferably be formed integrally and the proximal end of the actuating rod 297 preferably is provided with a threaded portion for threadedly receiving the piston 273. A jam nut 309 preferably engages the rod 297 and has an abutted relationship with the piston 273 to more positively secure the piston 273 to the rod 297.

The usual system for actuating the cylinder 291 is provided and includes an air pump 311, a four-way valve 313, and ancillary conduit members 315, 317, 319, 321. The pump 311, being mechanically driven in any well known manner, e. g., an electric motor (not shown) or the like, is selectively in communication with the cavities 301, 307 by positioning the valve 313. In other words, the conduit 315 has the one end thereof connected to the pump 311 and the other end connected to the valve 313. The conduit 317 has the one end thereof connected to the valve 313 and the other end connected to a coupling 323 leading into the cavity 307. Additionally, the conduit 319 has the one end thereof connected to a second coupling 325 leading into the cavity 301 and the other end thereof connected to the valve 313. The conduit 321 has the one end thereof connected to the valve 313 and the other end exhausts the air as the piston 295 travels from one position to another.

It should be understood that the valve 313 may selectively be manually moved to the left as viewed in FIG. 7, which causes the piston 295 to travel to the left, as viewed in FIG. 8. In other words, the pressure from the pump 311 is directed through the conduit 315 and the valve 313 directs the air pressure into the conduit 319 which pressurizes the cavity 301 and drives the piston 295 leftwardly as viewed in FIG. 8. The air displaced from he cavity 307 exits outwardly through the coupling 323, the conduit 317, and the conduit 321.

Movement of the piston 295 to the left as viewed in FIG. 8 causes the piston 273 to move to a position character referenced by the numeral 273' and identified as an "on" position.

The orifice assembly 237 includes an adjustable stop assembly 327 for limiting the travel of the piston 273'. The adjustable stop assembly 327 includes an elongated shaft 329, and a knob 238.

The cap member 281' is provided with a threaded concentric aperture for threadedly receiving the elongated shaft 329 and a lock nut 331 preferably is included and threadedly engages the shaft 329 and may be manually locked against the end plate 281 to more positively maintain the adjustment of the assembly 327.

The piston 273 is in an "off" position when the actuating piston 295 engages the shoulder portion 299, i. e., the hopper port 279 is isolated by the piston 273 from communicating with the upstream port 275, thus the hopper 19 is depressurized. When the piston 273 is in the "off" position all the air, emitting from the blower 15, depicted by arrows character-referenced by the numeral 333, exits from the variable restriction orifice assembly 237 through the downstream air chamber 236 thereof.

It should be understood that the "off" position depicted by the piston 273 is preferably utilized in conjunction with operating the handle 75 to the "off" position. In other words, when it is desired that the dispensing of salt 65 (FIG. 1) be discontinued temporarily, the valve 313 preferably is moved to the right as viewed in FIG. 7 which causes the piston to move to the position character-referenced by the numeral 273. Thus, the hopper 19 is depressurized simultaneously when the valve 21 is moved to the "off" position. Although not shown, it is anticipated that the handle 75 may be remotely operated in any well known manner, e. g., like that shown for moving the piston 273.

When the piston is in the "on" position character-referenced by the numeral 273', a portion of the air, depicted by arrows character-referenced by the numeral 335, by-passes the piston 273'. The air 335 exits the cylinder 271, through the hopper port 279 and is carried through the hopper pressurization air chamber 241 to the conduit 41. Thus, the hopper 19 is pressurized in like manner as previously disclosed, i. e., for the principal embodiment.

In other words, the hopper port 279 communicates with the upstream port 275 when the piston 273 is slidably moved to the "on" position character-referenced by the numeral 273'. It should be understood that the "on" position for the piston 273' in reality constitutes infinite positions depending upon the setting of the adjustable stop assembly 327. Backing off the shaft 329 allows more air 335 to by-pass the piston 273', thus increasing the pressure on the upper portion of the hopper 19. Obviously, pressurizing the hopper 19 increases the amount of salt particles 65 entrained with the air 333. Accordingly, changing the air pressure on the hopper 19 proportionally affects the amount of salt particles 65 which are dispensed.

Another feature which optionally is included in the dispensing device 11 of the present invention is the control of "dusting" by incorporating a "scrubbing" technique. Most granular material and certain salt will contain a certain percentage of very fine particles which tend to float off rather than gravitate downwardly immediately subjacent the cyclone separator. This is commonly known as dusting and in the case of salt can cause serious corrosion problems on equipment quite remote from the one in which the salt is in use. This problem is optionally obviated by introducing into the salt laden air 101 a small amount of moisture. This mist causes the fines of salt dust to coalesce into larger particles which gravitate downward when reaching the cyclone separator 27.

The proper amount of moisture and the point of introduction thereof is most important. I prefer to utilize a venturi principle for controllably introducing the water; however, other methods are equally effective, e. g., a pressurized discharge nozzle. The point of introduction of the water preferably is upstream of and adjacent the cyclone separator 27, or at a convenient point along the conduit 25. It should be obvious that the significant point or intent is to introduce the mist downstream of the valve 21 which controllably dispenses the salt so as to obviate objectionable moisture adjacent the valve 21. It should be pointed out that it is important to use just the right amount of water since too much will cause the salt to form a slurry and thus lose its granular characteristics. In addition, the salt will tend to accumulate on the sidewalls of the conduit 25 and the tubular member 85.

Although the invention has been described and illustrated with respect to preferred embodiments thereof, it is not to be so limited since changes and modifications may be made therein which are within the full intended scope of this invention.

I claim:

1. A dispensing device for hygroscopic granular substances comprising air source means providing a source of air current, an enclosed hopper means providing a cavity for receiving the hygroscopic granular substance to be dispensed; valve means disposed adjacent the lower end of said hopper means and having an upstream end, a downstream end, and a continuous passage between said upstream and downstream ends; said valve means including means at the lower end of said hopper providing a dispensing orifice communicating said cavity with said continuous passage for the passage of the granular substance in said hopper through said dispensing orifice into said continuous passage, agitator means in said cavity adjacent said dispensing orifice for contacting the granular substance to be dispensed to break up or sweep away any lumps of the granular substance adjacent said dispensing orifice, means providing a restriction orifice, means providing an upstream chamber upstream of said restriction orifice and communicated with said upstream chamber through said restriction orifice, means communicating said downstream chamber with said upstream end of said valve; means communicating said air source means with said upstream chamber to provide a flow of air through said upstream chamber, said restriction orifice, said downstream chamber, and said continuous passage with a higher pressure of air being provided in said upstream chamber than downstream of said restriction orifice in said downstream chamber and said continuous passage; means communicating said upstream chamber with said cavity for providing higher pressure air in said cavity than said continuous passage, and conduit means attached to said downstream end of said valve means for conducting the air and the granular substance from said continuous passage towards a point of use; including cyclonic separator means coupled to said conduit means for separating most of the air from the granular substance and for dropping the granular substance downwardly with a slight downward flow of air out of said separator means.

2. A dispensing device for hygroscopic granular substances comprising air source means providing a source of air current, an enclosed hopper means providing a cavity for receiving the hygroscopic granular substance to be dispensed; valve means disposed adjacent the lower end of said hopper means and having an upstream end, a downstream end, and a continuous passage between said upstream and downstream ends; said valve means including means at the lower end of said hopper providing a dispensing orifice communicating said cavity with said continuous passage for the passage of the granular substance in said hopper through said dispensing orifice into said continuous passage, agitator means in said cavity adjacent said dispensing orifice for contacting the granular substance to be dispensed to break up or sweep away any lumps of the granular substance adjacent said dispensing orifice, means providing a restriction orifice, means providing an upstream chamber upstream of said restriction orifice and communicated with said upstream chamber through said restriction orifice, means communicating said downstream chamber with said upstream end of said valve; means communicating said air source means with said upstream chamber to provide a flow of air through said upstream chamber, said restriction orifice, said downstream chamber, and said continuous passage with a higher pressure of air being provided in said upstream chamber than downstream of said restriction orifice in said downstream chamber and said continuous passage; means communicating said upstream chamber with said cavity for providing higher pressure air in said cavity than said continuous passage, and conduit means attached to said downstream end of said valve means for conducting the air and the granular substance from said continuous passage towards a point of use; said valve means including inner and outer telescopically disposed tubular members, said tubular members each having an aperture therethrough alignable with each other to establish said dispensing orifice, means attached to one of said tubular members for relatively moving said tubular members to vary the size of said dispensing orifice.

3. A dispensing device for hygroscopic granular substances comprising air source means providing a source of air current, an enclosed hopper means providing a cavity for receiving the hygroscopic granular substance to be dispensed; valve means disposed adjacent the lower end of said hopper means and having an upstream end, a downstream end, and a continuous passage between said upstream and downstream ends; said valve means including means at the lower end of said hopper providing a dispensing orifice communicating said cavity with said continuous passage for the passage of the granular substance in said hopper through said dispensing orifice into said continuous passage, agitator means in said cavity adjacent said dispensing orifice for contacting the granular substance to be dispensed to break up or sweep away any lumps of the granular substance adjacent said dispensing orifice, means providing a restriction orifice, means providing an upstream chamber upstream of said restriction orifice and communicated with said upstream chamber through said restriction orifice, means communicating said downstream chamber with said upstream end of said valve; means communicating said air source means with said upstream chamber to provide a flow of air through said upstream chamber, said restriction orifice, to break up or sweep away any lumps of the granular substance adjacent said dispensing orifice, means providing a restriction oriface, means providing an upstream chamber upstream of said restriction orifice and communicated with said upstream chamber through said restriction orifice, means communicating said downstream chamber with said upstream end of said valve; means communicating said air source means with said upstream chamber to provide a flow of air through said upstream chamber, said restriction orifice said downstream chamber, and said continuous passage with a higher pressure of air being provided in said upstream chamber than downstream of said restriction orifice in said downstream chamber and said continuous passage; means communicating said upstream chamber with said cavity for providing higher pressure air in said cavity than said continuous passage, and conduit means attached to said downstream end of said valve means for conducting the air and the granular substance from said continuous passage towards a point of use; said agitator means comprising a hub, a plurality of blades fixedly mounted on said hub and generally radially extending therefrom, and means rotatably driving said hub; said blades including at least one blade having the end thereof angled outwardly and rearwardly in onedirection to sweep through one side of said dispensing orifice, at least another blade having the end thereof angled outwardly and rearwardly in the opposite direction from said one blade to sweep through the other side of said dispensing orifice, and at least one straight blade to sweep through the middle of said dispensing orifice.

4. A dispensing device for hygroscopic granular substances comprising air source means providing a source of air current; an enclosed hopper means providing a cavity and having a funnel-like bottom for receiving the hygroscopic granular substance to be dispensed; and inner tubular member having upstream and downstream ends and a continuous passage therebetween, said inner tubular member having an aperture therein, an outer tubular member telescopically receiving said inner tubular member with said upstream and downstream ends extending outwardly beyond the opposite ends of said outer tubular member, said outer tubular member being fixed to the bottom of said hopper means for the closing off thereof, said outer tubular member having an aperture therethrough communicated with said cavity, means attached to said inner member for the moving thereof to overlap the apertures of said inner and outer tubular members to establish a variable dispensing orifice for dispensing the granular material from said cavity to said continuous passage, an agitator disposed in said cavity in the bottom of said hopper means, said agitator comprising a hub, a plurality of blades fixedly mounted on said hub and generally radially extending outwardly therefrom; said blades including a first pair of said blades extending outwardly in opposite directions from each other having the ends thereof angled outwardly and forwardly in one direction to sweep through one side of the aperture in said outer member, a second pair of blades extending outwardly in opposite directions from each other at 90° relative to said first pair of blades and having the ends thereof angled outwardly and rearwardly in the opposite direction from said first pair of blades to sweep through the opposite side of the aperture in said outer member, and the remaining ones of said blades being straight and respectively disposed between said first and second pairs of blades to sweep the center of the aperture in said outer member; means providing a restriction orifice, means providing an upstream chamber upstream of said restriction orifice nd a downstream chamber downstream of said restriction orifice and communicated with said upstream chamber through said restriction orifice, means communicating said downstream chamber with said upstream end of said inner member, means communicating said air source means with said upstream chamber to provide a flow of air through said upstream chamber, said restriction orifice, said downstream chamber, and said continuous passage with a higher pressure of air being provided in said upstream chamber than downstream of said restriction orifice in said downstream chamber and said continuous passage; means communicating said upstream chamber with said cavity for providing higher pressure air in said cavity than said continuous passage, and conduit means attached to said downstream end of said inner member for conducting the air and the granular substance from said continuous passage towards a point of use.

5. The dispensing device of claim 4 in which is included cyclonic separator means coupled to said conduit means for separating most of the air from the granular substance and for dropping the granular substance downwardly with a slight downward flow of air out of said separator means.

6. The dispensing device of claim 4 in which said means providing said restriction orifice includes means for varying the size of said restriction orifice.

7. A dispensing device for hygroscopic granular substances comprising air source means providing a source of air current, an enclosed hopper means providing a cavity for receiving the hygroscopic granular substance to be dispensed; valve means disposed adjacent the lower end of said hopper means and having an upstream end, a downstream end, and a continuous passage between said upstream and downstream ends; said valve means including means at the lower end of said hopper providing a dispensing orifice communicating said cavity with said continuous passage for the passage of the granular substance in said hopper through said dispensing orifice into said continuous passage, agitator means in said cavity adjacent said dispensing orifice for contacting the granular substance to be dispensed to break up or sweep away any lumps of the granular substance adjacent said dispensing orifice, piston means, cylinder means slidably receiving said piston means; said cylinder means being provided with upstream port means, downstream port means, and hopper port means; stop means for adjustably limiting the travel of said slidable piston means, said downstream port means communicating with said upstream port means through said cylinder means, said hopper port means communicating with said upstream port when said piston means is slidably moved to an engaged on position with said stop means; means communicating said air source means with said upstream port means to provide a flow of air through said upstream port means, said hopper port means, said downstream port means and said continuous passage with a higher pressure of air being provided in said upstream port means and said hopper port means than through said downstream port means, and said continuous passage; means communicating said hopper port means with said cavity for providing higher pressure air in said cavity than said continuous passage, and conduit means attached to said downstream end of said valve means for conducting the air and the granular substance from said continuous passage towards a point of use.

8. The dispensing device of claim 7 in which said piston means has an off position in which said hopper port means is isolated by said piston means from communicating with said upstream port means, and said device additionally includes means for activating said piston means for selectively moving said piston means from said off position to said on position and from said on position to said off position.

9. The dispensing device of claim 8 in which said stop means includes an elongated shaft means having proximal and distal ends, said shaft means being threadedly received by said cylinder means os that the proximal end thereof extends inwardly of said cylinder means for arresting said piston means hen said piston means is in said on position, and the distal end of said shaft means carries knob means for manually running said proximal end of said shaft means to and fro so as to proportionally vary the volume of air allowed to by-pass said piston means which subsequently passes through said hopper port means.

10. The dispensing device of claim 8 in which said activating means includes pneumatic cylinder means for operably moving said piston means to and from said on and off positions.

* * * * *